(12) United States Patent
Lee et al.

(10) Patent No.: US 6,637,821 B2
(45) Date of Patent: Oct. 28, 2003

(54) SEAT RECLINING DEVICE FOR VEHICLE

(75) Inventors: Won Young Lee, Kyungju-Shi (KR); Young Ho Bae, Kyungju-Shi (KR)

(73) Assignee: Daebu Machinery Co., Ltd., Kyungiu-shi (KR)

( * ) Notice: Subject to any disclaimer, the term of this patent is extended or adjusted under 35 U.S.C. 154(b) by 0 days.

(21) Appl. No.: 10/247,832

(22) Filed: Sep. 20, 2002

(65) Prior Publication Data

US 2003/0173810 A1 Sep. 18, 2003

(30) Foreign Application Priority Data

Mar. 14, 2002 (KR) ........................................ 2002-13744

(51) Int. Cl.$^7$ ................................................ B60N 2/02
(52) U.S. Cl. ........................................ 297/362; 475/162
(58) Field of Search .......................... 297/362; 475/162, 475/176, 177, 341

(56) References Cited

U.S. PATENT DOCUMENTS

| | | | | |
|---|---|---|---|---|
| 3,667,804 A | * | 6/1972 | Yasui et al. | 297/362 |
| 4,345,792 A | * | 8/1982 | Shephard | 297/362 |
| 5,368,363 A | * | 11/1994 | Sakamoto | 297/362 |
| 5,524,970 A | * | 6/1996 | Kienke et al. | 297/362 |
| 5,536,217 A | * | 7/1996 | Droulon et al. | 475/177 |
| 5,586,833 A | * | 12/1996 | Vossmann et al. | 403/359.6 |
| 5,725,452 A | * | 3/1998 | Droulon et al. | 475/162 |
| 5,871,414 A | * | 2/1999 | Voss et al. | 475/175 |
| 6,076,889 A | * | 6/2000 | Su et al. | 297/362 |
| 6,305,748 B1 | * | 10/2001 | Ohba | 297/362 |
| 2002/0050732 A1 | * | 5/2002 | Koga et al. | 297/362 |
| 2002/0091029 A1 | * | 7/2002 | Wang et al. | 475/162 |

FOREIGN PATENT DOCUMENTS

| | | | | |
|---|---|---|---|---|
| DE | 3129672 C1 | * | 10/1982 | F16H/25/06 |
| JP | 07069108 A | * | 3/1995 | B60N/2/22 |

* cited by examiner

Primary Examiner—Peter M. Cuomo
Assistant Examiner—Stephen D'Adamo
(74) Attorney, Agent, or Firm—Jacobson Holman PLLC (57) ABSTRACT

Disclosed is a seat reclining device for a vehicle. The seat reclining device comprises an upper toothed bracket fastened to a lower end of a seat back frame; a lower toothed bracket fastened to a rear end of a seat cushion frame; an operating section interposed between the upper and lower toothed brackets, for allowing a seat back to be reclined; and a cover plate for covering the upper and lower toothed brackets and the operating section. The operating section comprises upper teeth internally formed on a circumferential inner surface of a groove which is depressed on the upper toothed bracket; lower teeth externally formed on a circumferential outer surface of a protrusion which projects from the lower toothed bracket toward the upper toothed bracket and is received in the groove of the upper toothed bracket, such that the lower teeth can be meshed with the upper teeth; a pair of cams accommodated in a cam hole which is defined at a center portion of the lower toothed bracket, to rotate the lower teeth of the lower toothed bracket in a desired reclining direction; and a cam spring having both ends which are respectively fitted into spring holes defined in the cams, to bias the cams in opposing radial outward directions.

2 Claims, 7 Drawing Sheets

SEAT RECLINING DEVICE FOR VEHICLE

BACKGROUND OF THE INVENTION

1. Field of the Invention

The present invention relates to a seat reclining device for a vehicle, and more particularly, the present invention relates to a seat reclining device for a vehicle which is configured to allow an angle of a vehicle seat back to be continuously adjusted as desired in forward and rearward directions for ensuring comfort of an occupant.

2. Description of the Related Art

A vehicle seat functions to ensure comfort of an occupant. The vehicle seat is provided with a seat reclining device which allows an angle of a seat back to be adjusted in forward and rearward directions in conformity with a desire of an occupant, that is, a passenger or a driver.

The seat reclining device is arranged at a region where a seat cushion frame and a seat back frame which constitute a seat are connected with each other. By manipulating a lever of the seat, projecting sideward, the seat back can be adjusted in its angle with respect to the seat cushion.

Figure 1:
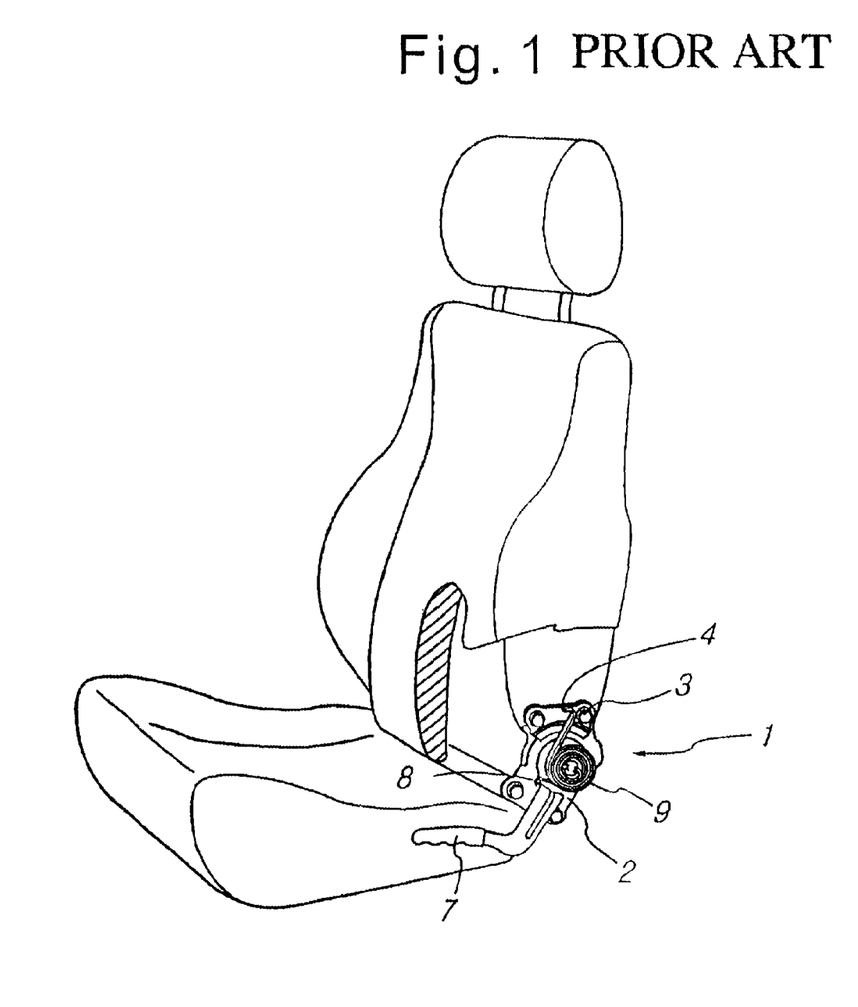
FIG. 1 is a partially broken-away perspective view illustrating a vehicle seat to which a conventional seat reclining device for a vehicle is applied.
Figure 2:
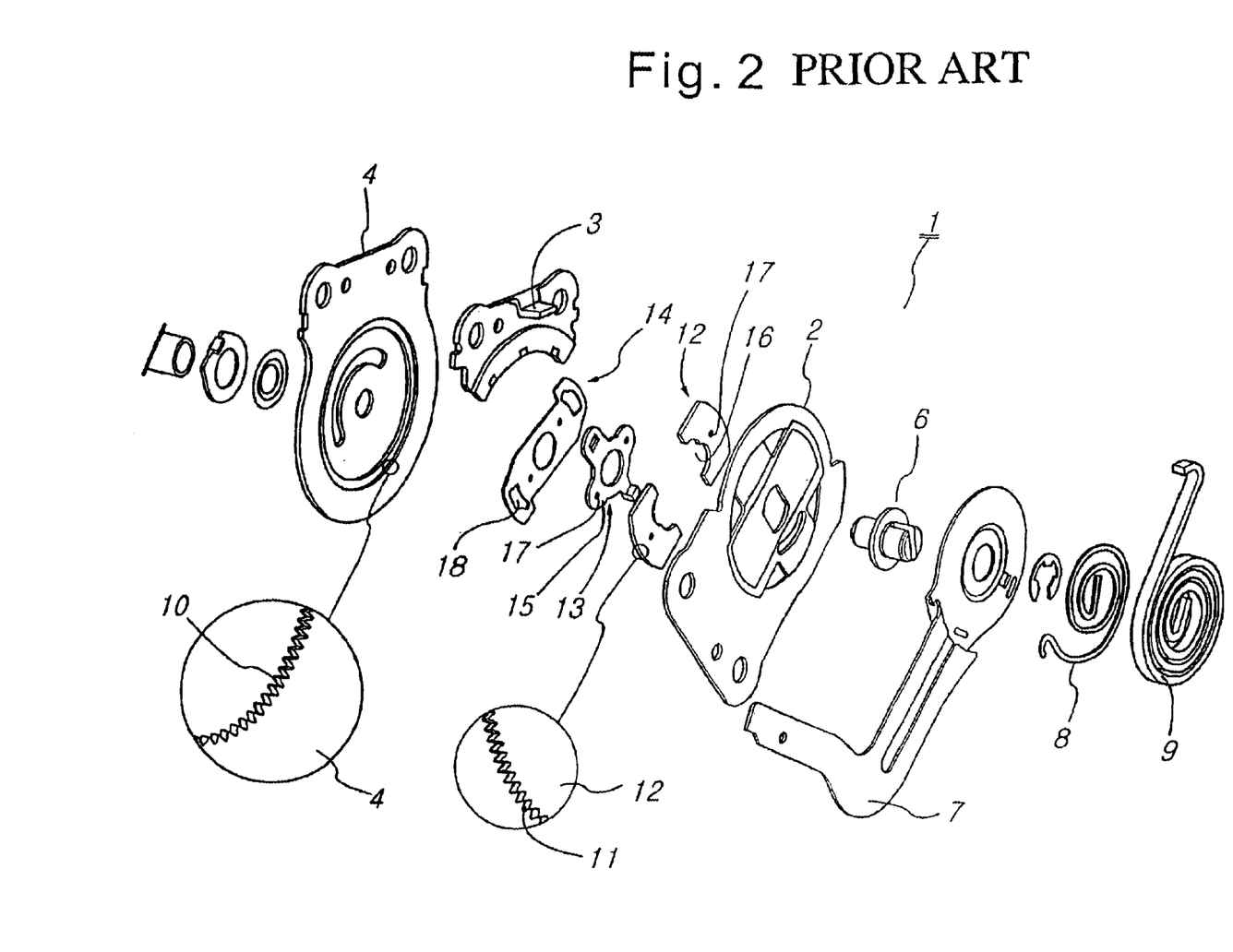
FIG. 2 is a partially enlarged exploded perspective view illustrating the conventional seat reclining device for a vehicle.

A conventional seat reclining device will be disclosed below with reference to FIGS. 1 and 2.

The conventional seat reclining device 1 includes a plate holder 2 which is fastened to a rear end of a seat cushion frame and a toothed bracket 4 which is fastened by the medium of an upper bracket 3 to a lower end of a seat back frame. An operating section is interposed between the plate holder 2 and the toothed bracket 4. The toothed bracket 4 is formed with first teeth 10. A manipulating section is externally coupled to the plate holder 2. The manipulating section comprises a shaft 6, a manipulating lever 7, a lever spring 8 and a return spring 9.

The operating section comprises a pair of operating members 12, a cam lever 13 and a cam plate 14. The operating members 12 are placed in a space defined between the plate holder 2 and the toothed bracket 4. The operating members 12 are formed with second teeth 11 in a manner such that the second teeth 11 can be meshed with and separated from the first teeth 10 formed in the toothed bracket 4 so as to permit and prevent reclining of a seat back. The cam lever 13 functions to move the operating members 12 in a manner such that the second teeth 11 are meshed with the first teeth 10, and the cam plate 14 functions to move the operating members 12 in a manner such that the second teeth 11 are separated from the first teeth 10.

The cam lever 13 is formed with a pair of cams 15. The cams 15 function to push the operating members 12 in a direction where the second teeth 11 are meshed with the first teeth 10. The operating members 12 are defined with a pair of cam grooves 16 for respectively receiving the cams 15 when it is necessary to separate the second teeth 11 from the first teeth 10.

Two pairs of projecting pins 17 are formed on the operating members 12 and the cam lever 13. A pair of slots 18 are defined in the cam plate 14 in a manner such that one pair of projecting pins 17 which are respectively formed on the operating members 12 are inserted into the pair of slots 18. Also, a pair of pin holes are defined in the cam plate 14 inward of the slots 18 in a manner such that the other one pair of projecting pins 17 which are formed on the cam lever 13 are inserted into the pair of pin holes.

Describing operations of the conventional seat reclining device 1 constructed as mentioned above, initially, the lever spring 8 and return spring 9 bias, via the cam lever 13, the operating members 12 in a manner such that the second teeth 11 of the operating members 12 are meshed with the first teeth of the toothed bracket 4.

In this state, when it is necessary to recline the seat back, by pulling upward the manipulating lever 7, the shaft 6 is rotated. Then, as the cam lever 13 coupled to the shaft 6 is rotated, the pair of cams 15 are respectively received in the cam grooves 16 defined in the operating members 12. Also, as the cam plate 14 coupled to the shaft 6 is rotated with the projecting pins 17 of the operating members 12 inserted into the slots 18 of the cam plate 14, the second teeth 11 of the operating members 12 are separated from the first teeth 10 of the toothed bracket 4, whereby it is possible to recline the seat back.

However, the conventional seat reclining device 1 suffers from defects in that the number of component parts is increased, and thereby, assemblability and productivity of the seat reclining device 1 are deteriorated. Also, malfunction of the seat reclining device 1 can occur due to misassembly of the cam plate 14 which comprises a thin plate.

Specifically, in the conventional seat reclining device 1, since a chance that the seat back is abruptly and too forcefully reclined by the presence of the return spring. 9 is increased, even while being seated, an old or feeble person may feel a substantial amount of shock when the seat back is reclined forward.

Further, even if the manipulating lever 7 is pulled while a person is not seated, as the seat back is violently rotated forward, a manipulator such as a driver may be injured and an impulsive operating sound is generated.

SUMMARY OF THE INVENTION

Accordingly, the present invention has been made in an effort to solve the problems occurring in the related art, and an object of the present invention is to provide a seat reclining device for a vehicle which is configured to be decreased in the number of component parts and to allow a vehicle seat back to be reclined only by an angle desired by a manipulator.

Another object of the present invention is to provide a seat reclining device for a vehicle which reduces a manufacturing cost, improves productivity, prevents a seat back from being abruptly and too forcefully reclined and operation noise from being generated, thereby protecting the human body from being injured, elevating quality of the seat reclining device and ensuring comfort of an occupant.

In order to achieve the above objects, according to one aspect of the present invention, there is provided a seat reclining device for a vehicle, arranged at a region where a seat cushion frame and a seat back frame, which constitute a vehicle seat having a seat cushion and a seat back, are connected with each other, to allow an angle of the seat back to be adjusted in forward and rearward directions, the device comprising: an upper toothed bracket fastened to a lower end of the seat back frame; a lower toothed bracket fastened to a rear end of the seat cushion frame; an operating section interposed between the upper and lower toothed brackets, for allowing the seat back to be reclined; and a cover plate for covering the upper and lower toothed brackets and the operating section; wherein the operating section comprises upper teeth internally formed on a circumferential inner surface of a groove which is depressed on the upper toothed bracket; lower teeth externally formed on a circumferential outer surface of a protrusion which projects from the lower toothed bracket toward the upper toothed bracket and is received in the groove of the upper toothed bracket, in a manner such that the lower teeth can be meshed with the upper teeth; a pair of cams accommodated in a cam hole which is defined at a center portion of the lower toothed bracket, to rotate the lower teeth of the lower toothed bracket in a desired reclining direction; and a cam spring having both ends which are respectively fitted into spring holes defined in the cams, to bias the cams in opposing radial outward directions; and wherein each cam has a shaft hole through which an operating shaft is fitted; a boss which is formed around the shaft hole on a surface of the cam; an operating cam part which is formed on a circumferential outer surface of the cam to extend through a first predetermined angle and is brought into contact with a circumferential inner surface of the lower toothed bracket, defining the cam hole, the operating cam part having an eccentric center which is deviated from a center of the cam hole, to serve as a kind of wedge; a concentric part which is formed on a surface of the operating cam part, farthest from the boss, to extend through a second predetermined angle less than the first predetermined angle, and has a stepped portion in a manner such that concentric parts of the pair of cams can be brought into contact with each other; and a key groove which is defined to be communicated with the shaft hole in a manner such that a key integrally formed on the operating shaft can be received in the key groove to operate the cam toward a recline permitting position.

According to another aspect of the present invention, the lower teeth has the number of teeth which is less than that of the upper teeth, in a manner such that a position of the upper toothed bracket can be changed by rotation of the lower toothed bracket.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
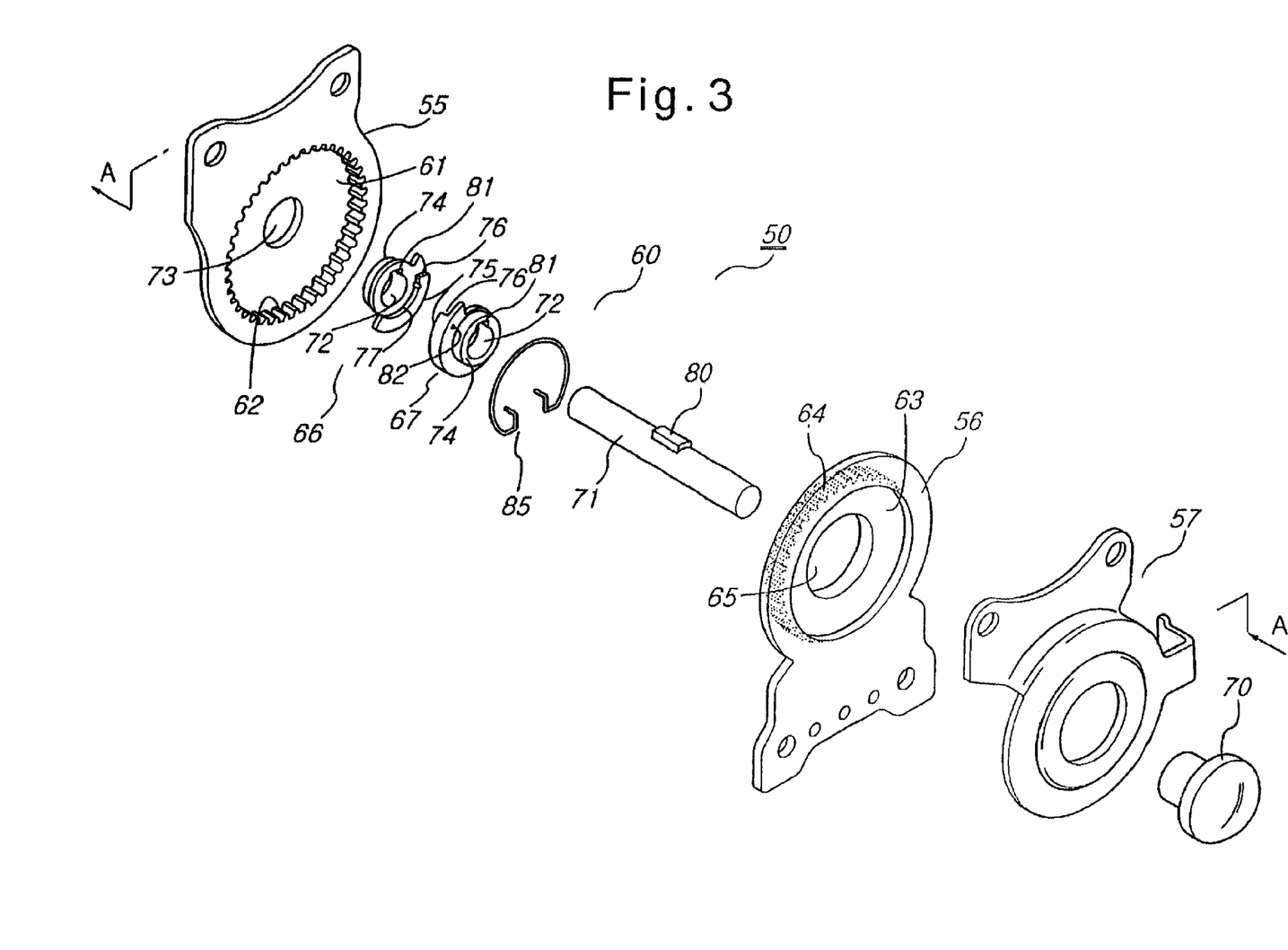
FIG. 3 is a partially enlarged exploded perspective view illustrating a seat reclining device for a vehicle in accordance with an embodiment of the present invention.

A seat reclining device 50 for a vehicle, in accordance with an embodiment of the present invention, includes an upper toothed bracket 55, a lower toothed bracket 56, an operating section 60, and a cover plate 57. The upper toothed bracket 55 is fastened to a lower end of a seat back frame of a vehicle seat which is composed of a seat cushion and a seat back. The lower toothed bracket 56 is fastened to a rear end of a seat cushion frame. The operating section 60 is interposed between the upper and lower toothed brackets 55 and 56, to allow the seat back to be reclined. The cover plate 57 functions to cover the upper and lower toothed brackets 55 and 56 and the operating section 60.

The operating section 60 comprises upper teeth 62, lower teeth 64, a pair of cams 66 and 67, and a cam spring 85. The upper teeth 62 are internally formed on a circumferential inner surface of a side wall defining a groove 61 which is depressed on the upper toothed bracket 55. The lower teeth 64 are externally formed on a circumferential outer surface of a protrusion 63 which is projectedly formed on the lower toothed bracket 56 to extend toward the upper toothed bracket 55 and be received in the groove 61 of the upper toothed bracket 55 in a manner such that the lower teeth 64 are meshed with the upper teeth 62.

The lower teeth 64 has the number of teeth which is less than that of the upper teeth 62, in a manner such that a position of the upper toothed bracket 55 can be changed by rotation of the lower toothed bracket 56 and thereby the seat back can be reclined.

A cam hole 65 is defined at a center portion of the lower toothed bracket 56 which is formed with the lower teeth 64. The pair of cams 66 and 67 are accommodated in the cam hole 65 to rotate the lower teeth 64 of the lower toothed bracket 56 in a desired reclining direction.

The pair of cams 66 and 67 have the same configuration and are accommodated in the cam hole 65 in a manner such that one of the cams 66 and 67 are positioned in a state wherein it is rotated by a predetermined angle relative to the other of the cams 66 and 67. Each cam 66 and 67 is defined with a shaft hole 72 through which an operating shaft 71 is fitted. The operating shaft 71 is coupled with operating means 70 such as an operating knob and a driving motor, to operate the cams 66 and 67.

A boss 74 is formed around the shaft hole 72 on a surface of each cam 66 and 67. Bosses 74 of both cams 66 and 67 are stably held inserted into center holes 73 which are defined in the upper toothed bracket 55 and the cover plate 57, respectively, to balance the cams 66 and 67.

An operating cam part 75 is formed on a circumferential outer surface of each cam 66 and 67 to have substantially a semicircular configuration and extend through a first predetermined angle. The operating cam part 75 is brought into contact with a circumferential inner surface of the lower toothed bracket 56, defining the cam hole 65. The operating cam part 75 has an eccentric center P1 which is deviated from a center P of the cam hole 65. Therefore, as operating cam parts 75 of both cams 66 and 67 are brought into contact with the circumferential inner surface of the lower toothed bracket 56, defining the cam hole 65, they can cooperate with each other to serve as a kind of wedge at their maximum eccentric position.

A concentric part 77 is formed on a surface of the operating cam part 75, which surface is farthest from the boss 74, to extend through a second predetermined angle which is less than the first predetermined angle. The concentric part 77 has a stepped portion 76 in a manner such that concentric parts 77 of both cams 66 and 67 can be brought into contact with each other. A key groove 81 is defined in each cam 66 and 67 to be communicated with the shaft hole 72, in a manner such that a key 80 integrally formed on the operating shaft 71 can be received in the key groove 81 to operate the corresponding cam 66 and 67 toward a recline permitting position.

A pair of spring holes 82 are respectively defined in the cams 66 and 67. Both ends of the cam spring 85 are respectively fitted into the spring holes 82 to bias the cams 66 and 67 in opposing radial outward directions.

Hereafter, operations of the seat reclining device 50 for a vehicle according to the present invention, constructed as mentioned above, will be described. The seat reclining device 50 can be operated between a recline permitting position and a recline forbidding position. It is to be readily understood that, in the recline permitting position, the seat back can be reclined in any of forward and backward directions.

Figure 4:
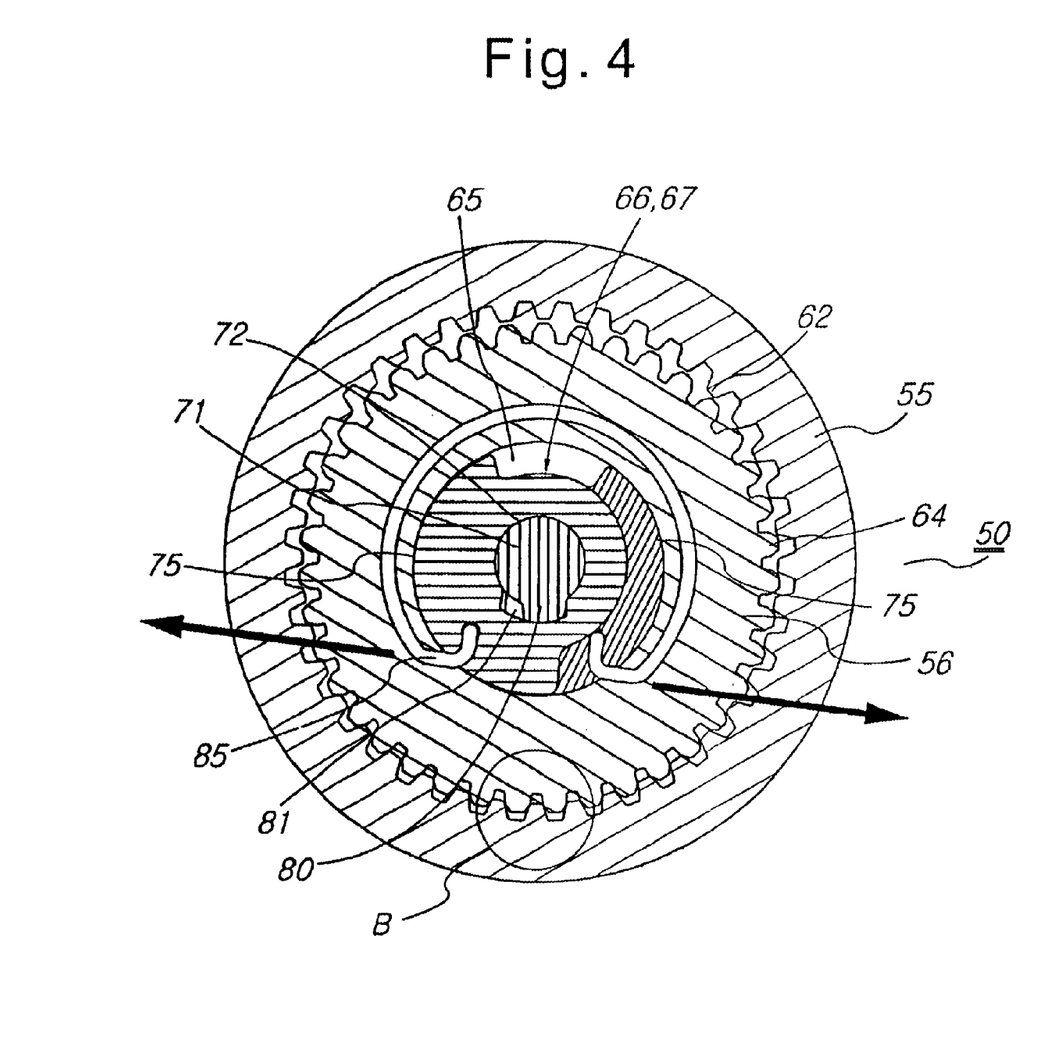
FIG. 4 is a cross-sectional view taken along the line A—A of FIG. 3, illustrating a recline forbidding position of the seat reclining device according to the present invention, which is in an assembled state.

In the recline forbidding position, as shown in FIG. 4, the cams 66 and 67 accommodated in the cam hole 65 which is defined through the lower toothed bracket 56 are biased by the cam spring 85 in the opposing radial outward directions as shown by the straight arrows.

Figure 5:
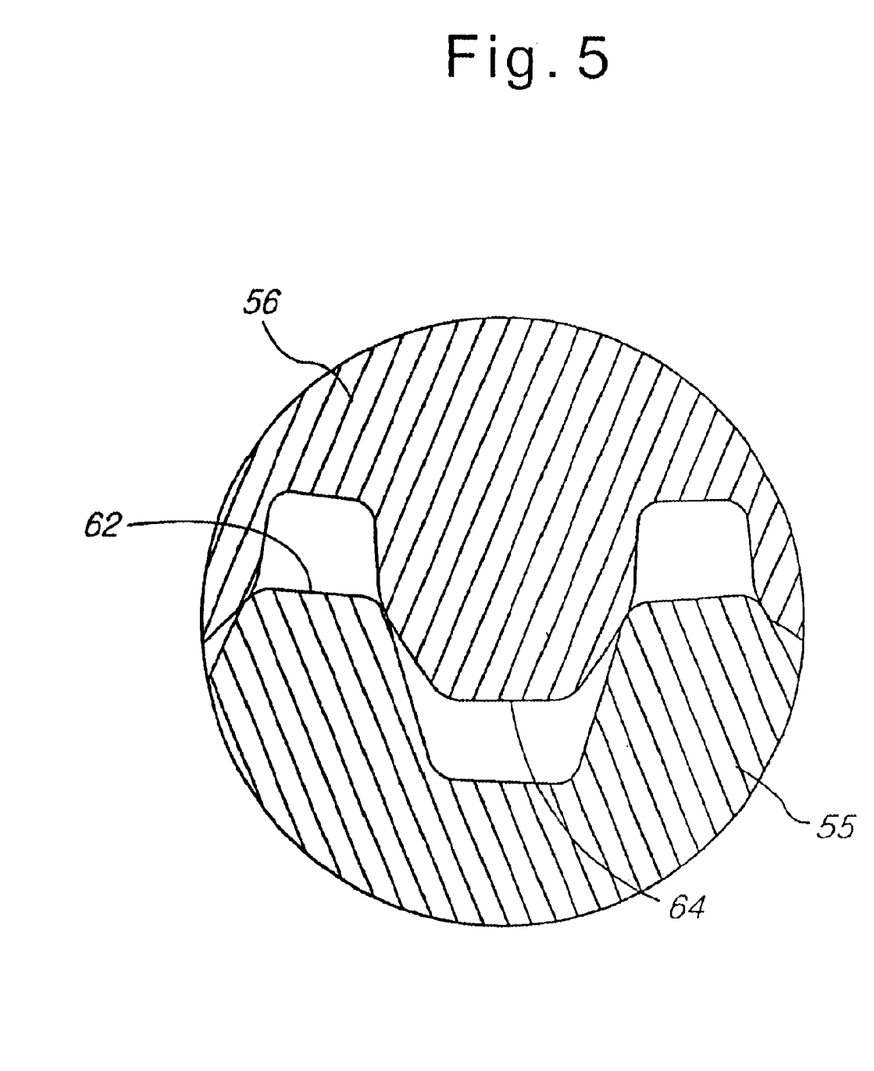
FIG 5 is an enlarged view for the 'B' part of FIG. 4.

At this time, since the cam 67, which is positioned at the right side when viewed on the plane of FIG. 4, is eccentrically positioned from the operating shaft 71, as the cams 66 and 67 are biased in leftward and rightward directions, the lower toothed bracket 56 is moved downward, and therefore, as can be readily seen from FIG. 5, no gap exists between the meshed upper and lower teeth 62 and 64.

Due to this fact that no gap exists between the meshed upper and lower teeth 62 and 64, it is possible to prevent the seat back from being fluctuated in its position and noise from being generated while the seat reclining device 50 is in the recline forbidding position, and ensure riding comfort.

Figure 6:
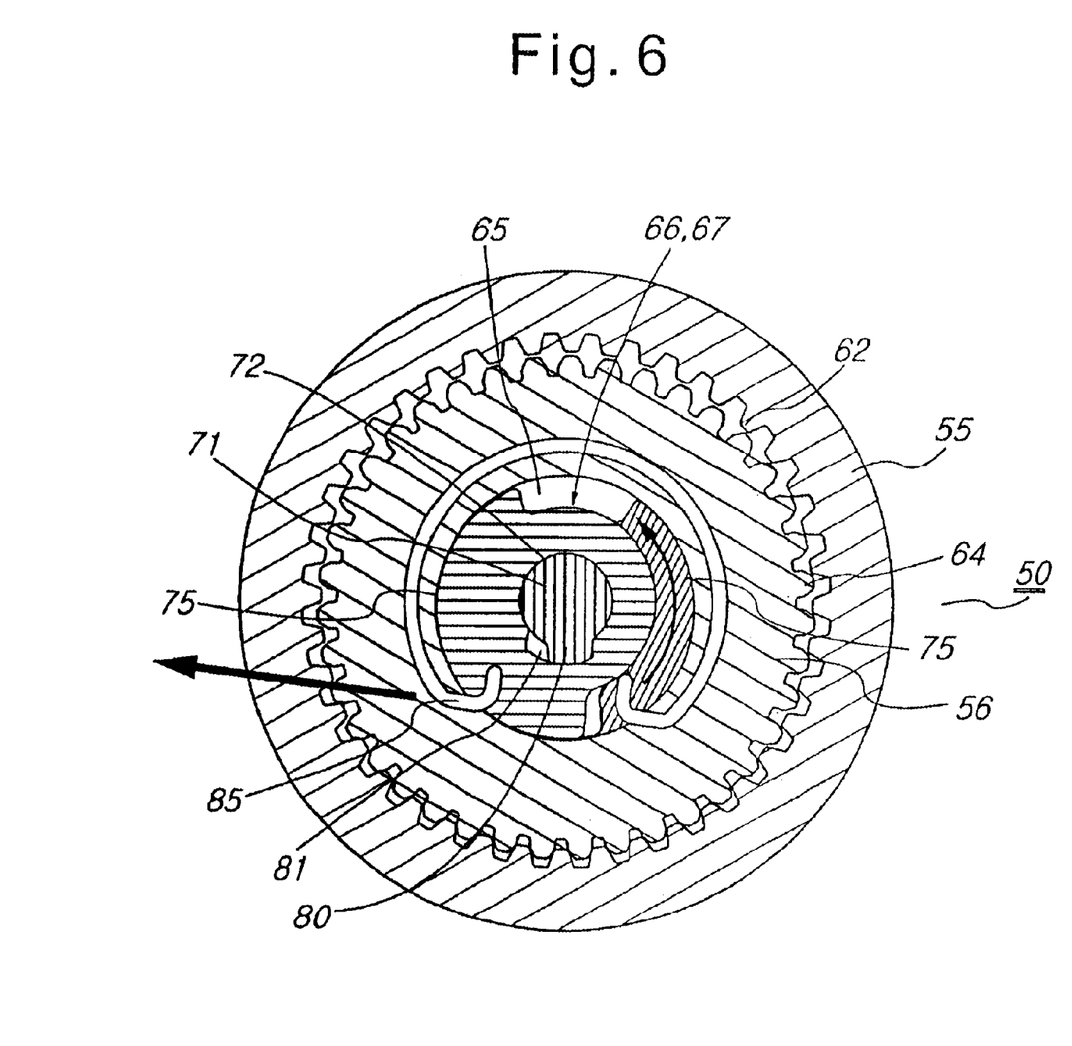
FIG. 6 is a cross-sectional view taken along the line A—A of FIG. 3, illustrating a recline permitting position of the seat reclining device according to the present invention, which is in an assembled state.
Figure 7:
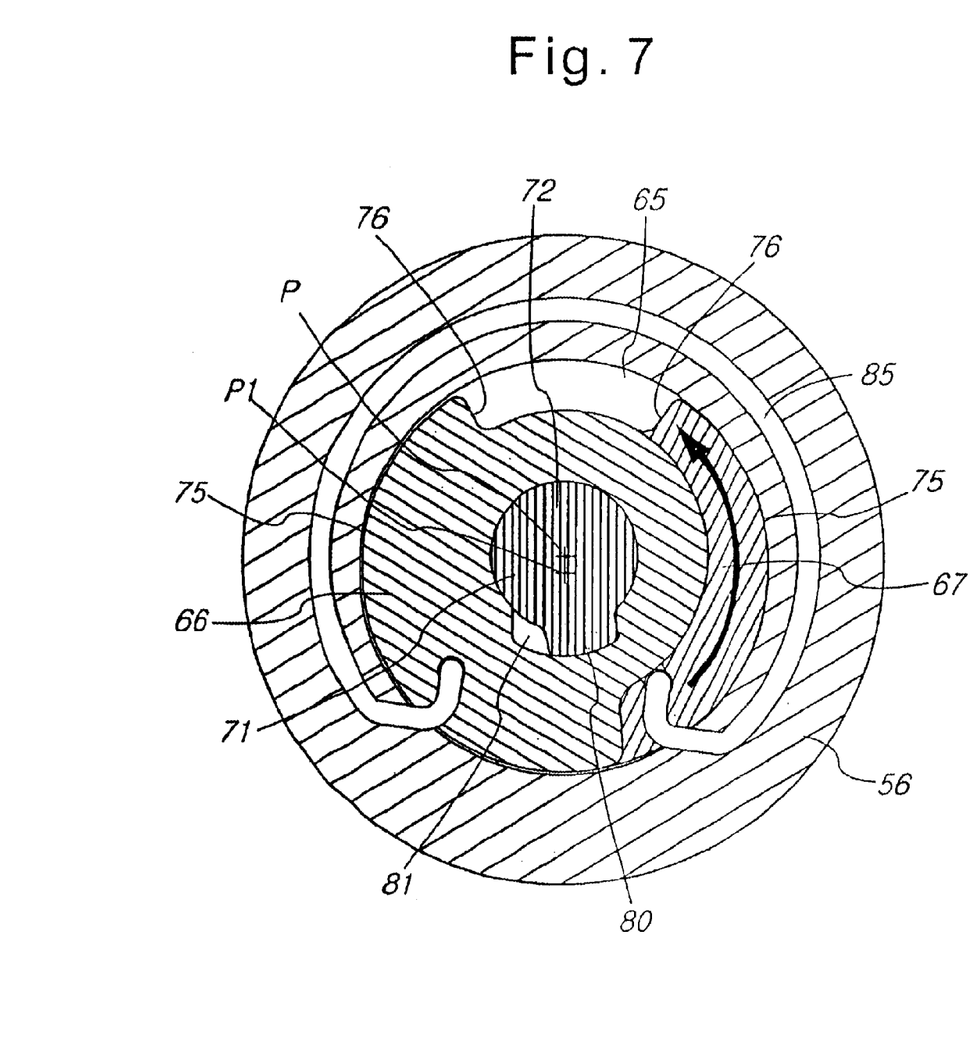
FIG. 7 is a partial enlarged view of the seat reclining device shown in FIG. 6.

In this state, when it is necessary to operate the seat reclining device 50, as can be readily seen from FIG. 6, by manipulating the operating means 70 connected to an axial outer end of the operating shaft 71 in a desired direction, the seat back can be reclined.

Of course, as described above, the operating means 70 may comprise an operating knob which is to be manually rotated by an operator and a driving motor which can be driven by a switch to be rotated in forward and backward directions. In this preferred embodiment, it will be described for illustrative purposes that the operating shaft 71 is rotated in a counterclockwise direction.

As the operating shaft 71 is rotated in the counterclockwise direction using the operating means 70, the key 80 is also integrally rotated in the key groove 81 in the counterclockwise direction, and the left cam 66 is forced to be rotatingly moved rightward.

Thereby, as the cam 66 is separated from the circumferential inner surface of the lower toothed bracket 56, defining the cam hole 65, a space is produced therebetween. At the same time, since the cam spring 85 biases the cams 66 and 67 in the opposing radial outward directions while the operating shaft 71 is continuously rotated, the right cam 67 is rotatingly moved toward the space in a direction shown by the curved arrow.

As a result, by the fact that the cams 66 and 67 can be rotated by the operating shaft 71 in the cam hole 65 defined in the lower toothed bracket 56 while the upper and lower teeth 62 and 64 are meshed with each other, the seat back can be smoothly reclined through a desired angle.

Of course, when it is necessary to recline the seat back in a reverse direction, the operating means 70 can be rotated in the opposite clockwise direction.

As apparent from the above description, the seat reclining device for a vehicle according to the present invention provides advantages as described below. Since the number of component parts constituting the seat reclining device is decreased, a manufacturing cost is reduced and productivity is improved. Also, because the seat reclining device is operated in a manner such that a seat back is prevented from being abruptly and too forcefully reclined and operation noise is not generated, the human body is protected from being injured and quality of the seat reclining device is elevated.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A seat reclining device for a vehicle, arranged at a region where a seat cushion frame and a seat back frame, which constitute a vehicle seat having a seat cushion and a seat back, are connected with each other, to allow an angle of the seat back to be adjusted in forward and rearward directions, the device comprising:

an upper toothed bracket fastened to a lower end of the seat back frame;

a lower toothed bracket fastened to a rear end of the seat cushion frame;

an operating section interposed between the upper and lower toothed brackets, for allowing the seat back to be reclined; and a cover plate for covering the upper and lower toothed brackets and the operating section;

wherein the operating section comprises upper teeth internally formed on a circumferential inner surface of a groove which is depressed on the upper toothed bracket; lower teeth externally formed on a circumferential outer surface of a protrusion which projects from the lower toothed bracket toward the upper toothed bracket and is received in the groove of the upper toothed bracket, in a manner such that the lower teeth can be meshed with the upper teeth; a pair of cams accommodated in a cam hole which is defined at a center portion of the lower toothed bracket, to rotate the lower teeth of the lower toothed bracket in a desired reclining direction; and a cam spring having both ends which are respectively fitted into spring holes defined in the cams, to bias the cams in opposing radial outward directions; and wherein each cam has a shaft hole through which an operating shaft is fitted; a boss which is formed around the shaft hole on a surface of the cam; an operating cam part which is formed on a circumferential outer surface of the cam to extend through a first predetermined angle and is brought into contact with a circumferential inner surface of the lower toothed bracket, defining the cam hole, the operating cam part having an eccentric center which is deviated from a center of the cam hole, to serve as a wedge; a concentric part which is formed on a surface of the operating cam part, farthest from the boss, to extend through a second predetermined angle less than the first predetermined angle, and has a stepped portion in a manner such that concentric parts of the pair of cams can be brought into contact with each other; and a key groove which is defined to be communicated with the shaft hole in a manner such that a key integrally formed on the operating shaft can be received in the key groove to operate the cam toward a recline permitting position.

2. The seat reclining device as set forth in claim 1, wherein the lower teeth has the number of teeth which is less than that of the upper teeth, in a manner such that a position of the upper toothed bracket can be changed by rotation of the lower tooth bracket.

* * * * *